(12) United States Patent
Saarelma et al.

(10) Patent No.: US 6,268,940 B1
(45) Date of Patent: Jul. 31, 2001

(54) METHOD AND APPARATUS FOR MAXIMIZING THE VISUAL QUALITY OF IMAGE PRESENTED IN ELECTRIC FORM

(75) Inventors: Hannu Saarelma; Pekka Laihanen, both of Espoo (FI)

(73) Assignee: Teknillinen Korkea Koulu Graafisen Tekniikan Laboratorio, Espoo (FI)

( * ) Notice: Subject to any disclaimer, the term of this patent is extended or adjusted under 35 U.S.C. 154(b) by 0 days.

(21) Appl. No.: 08/973,894

(22) PCT Filed: Jun. 7, 1996

(86) PCT No.: PCT/FI96/00339

§ 371 Date: Feb. 27, 1998

§ 102(e) Date: Feb. 27, 1998

(87) PCT Pub. No.: WO97/01151

PCT Pub. Date: Jan. 9, 1997

(30) Foreign Application Priority Data

Jun. 20, 1995 (FI) .......................................... 953061

(51) Int. Cl.[7] ...................................................... G03F 3/08
(52) U.S. Cl. ................................................ 358/520; 358/518
(58) Field of Search ............................. 395/109; 382/112, 382/162, 167; 358/501, 518, 520, 522, 527, 530, 523

(56) References Cited

U.S. PATENT DOCUMENTS

| | | | |
|---|---|---|---|
| 4,339,185 | 7/1982 | Nakauchi et al. | 396/234 |
| 4,679,095 | 7/1987 | Kitamura et al. | 358/515 |
| 5,282,030 | 1/1994 | Nishimura et al. | 348/71 |
| 5,323,241 | * 6/1994 | Yonezawa | 358/298 |
| 5,357,352 | 10/1994 | Eschbach | 358/518 |
| 5,436,733 | * 7/1995 | Terada et al. | 358/448 |
| 5,576,847 | * 11/1996 | Sekine et al. | 358/448 |
| 5,652,804 | * 7/1997 | Bronstein et al. | 382/141 |
| 5,664,072 | * 9/1997 | Ueda et al. | 358/1.9 |
| 5,767,991 | * 6/1998 | Hara | 358/518 |
| 5,768,403 | * 6/1998 | Suzuki et al. | 382/165 |
| 5,838,455 | * 11/1998 | Imaizumi t al. | 358/298 |

FOREIGN PATENT DOCUMENTS 519761   12/1992   (EP) .

* cited by examiner

Primary Examiner—Cheukfan Lee

(57) ABSTRACT

The present invention relates to a procedure and an apparatus for optimizing the visual quality of an image. In the procedure, the greyness balance of the image is adjusted by a statistical method and the color reproduction is adjusted to make it correspond to a standard observer's preference, which is a predetermined optimum value for color reproduction. The procedure can be used e.g. to improve the quality of images transmitted over information networks by providing the image transmission path with an apparatus which corrects images detected in the transmission path by applying the procedure of the present invention.

18 Claims, 1 Drawing Sheet

METHOD AND APPARATUS FOR MAXIMIZING THE VISUAL QUALITY OF IMAGE PRESENTED IN ELECTRIC FORM

BACKGROUND OF THE INVENTION

The present invention relates to a procedure for maximizing the visual quality of an image as defined in the claims.

In addition, the present invention relates to an apparatus for maximizing the visual quality of an image as defined in the claims.

As the use of information networks is gaining ground and their data transmission capacity is increasing, increasing numbers of digital colour images are being transmitted across the networks. Images are sent into the network from various sources, using different equipment and various encoding and packing methods known in themselves. Moreover, the technical origin of the images is generally unknown to the receiver.

Due to errors caused by the operations performed on the image, such as encoding and packing, as well as errors generated in the data transfer medium, the visual quality of the image is often deteriorated as compared with its original visual quality. For this reason, methods for implementing the colour reproduction of an image have been developed to maximize the visual quality of the image. In an optimal case, the reproduced image reproduces the visual impression given by an error-free original image unchanged. In practice, however, this is not always possible. A basic reason for this is that the original image usually has a larger range of colours than is possible to reproduce. But even if all the colours in the original could be reproduced, creating a visual similarity would still be difficult. That is to say, current chromatics does not know any methods for quantitatively determining the colour impressions produced by normal images consisting of numerous fields of different colours and shapes.

Several methods for colour correction and calibration, for improving the visual quality of an image, are known in the art. A feature common to these methods is that the technical origin of the image is known or a "model" (a high-quality photograph) of the image exists. However, the technical origin of an image received e.g. over an information network is not known, and therefore the prior-art methods cannot be used to improve the visual quality of the image.

It is possible to improve the visual quality of an image by a manual method, whereby an operator processing the image makes observations about the original picture, an image displayed on a computer screen or printed out on a printer, and corrects the colour reproduction manually on the basis of his/her own observations and skill. However, processing an image by this manual method is a slow and laborious business and requires a skilled image processing operator. Moreover, manual image processing requires expensive machines which must be compatible with each other and calibrated to ensure e.g. that an image displayed on-screen visually corresponds to its printed copy.

SUMMARY OF THE INVENTION

The object of the present invention is to eliminate the problems and drawbacks described above.

A specific object of the present invention is to produce a new type of procedure for image processing which can be easily implemented and automated for use in the processing of large amounts of images.

A further object of the present invention is to produce an apparatus which can be used for the processing of an image being transmitted in an information network, a printing system or the like to optimize the visual quality of the image without significantly retarding its transmission.

An additional object of the present invention is to present a procedure which can be used for improving the visual quality of an image without special image processing skill.

As for the features characteristic of the present invention, reference is made to the claims.

In the procedure of the present invention, an image in electronic format, preferably a colour image, is processed. The image may be a packed one, obtained by packing methods known in themselves, e.g. methods employing the GIF or TIFF standard. According to the invention, the image is converted into a chromaticity coordinate format, preferably an Lsα coordinate format, where L stands for lightness, s for colour saturation, and α for hue angle. The Lsα values are determined for the RGB values in FIG. 1 according to predefined equations. The image can also be converted into a format employing a different coordinate system. After this, the greyness balance of the image is determined and compared with a standard observer's greyness balance preference. Based on this comparison, the greyness balance of the image is adjusted to make it correspond to the standard observer's preference. In connection with the adjustment of the greyness balance in a preferred case, the highest and lowest lightness values of the grey shades are determined, a probability model is used to determine whether the shades should be neutral grey and the whole image is shifted in the colour space so that the highest and the lowest values correspond to neutral grey. The purpose of this operation is to adjust the greyness balance of the image so that white will be perceived as white and black will be perceived as black to a maximum degree of "correctness". Finally, according to the invention, the optimized image is converted from the chromaticity coordinate format back into its original format.

The colour reproduction of the image is optimized to make it correspond to a standard observer's preference. A visual processor has been taught a preference selected on the basis of a large number of images of various themes presented to a number of test persons. The visual processor adjusts the visual quality of each image to a maximum level. The teaching of the visual processor can be performed by a control parameter optimizing method of a neural network method.

The procedure of the invention, has several advantages as compared with prior art. The most important and most significant advantage is undoubtedly the fact that the procedure corrects the visual quality of the image automatically and independently of the source, in other words, the technical origin as well as the "correct" colour reproduction are unknown. Furthermore, the procedure can be implemented independently of hardware, which means that the display device or printer eventually used to reproduce the image need not be known. The procedure can also be provided with profiles of different output device groups or individual devices, and the procedure can be incorporated in individual output devices.

A further advantage of the present invention as compared with prior art is that the procedure can be easily standardized for use as a method of improving image quality in information networks. Moreover, the procedure can be applied for different types of display devices, including the cathode ray tube, liquid crystal display and electroluminescent display. Further, the procedure can be applied for different types of display control systems, including standardized computer screens and computer screens developed for special uses, as well as television screens employing the normal and HDTV standards. In addition, the procedure can be applied for different types of colour printer, including electrography, ink jet, thermal printers, electronic colour printing machines and other printing machines connectable to a computer.

In an embodiment of the present invention, the colour reproduction of an image is determined and compared with a predetermined colour reproduction preference of a standard observer and based on this comparison, the colour reproduction of the image is accentuated to make it correspond to the standard observer's preference. Preferably the colour reproduction of the image is accentuated by adjusting the global colour reproduction of the image to make it correspond to the standard observer's preference. Global colour reproduction means the colour reproduction in the entire image, in other words, at this stage of the procedure the colours in the entire image are crispened or accentuated.

In another embodiment of the invention, the colour reproduction of the image is accentuated by locating local colour areas on the basis of occurrence probabilities and adjusting the colour reproduction in the image areas encountered to make it correspond to the standard observer's preference. In searching the image for local colour areas, detected continuous areas of sufficient size are compared with predefined values. A given standard colour can be defined beforehand e.g. for the human skin, the sky, water and any objects, such as a Coca Cola can. From the shape, size, position and size of chromaticity statistic of a colour area encountered, it is possible to infer whether it is a predefined colour type. If such as colour type is encountered, the local colour area in the image is adjusted to make it correspond to the predefined colour.

In an embodiment of the present invention, the image is classified according to certain classification rules. First, the image can be subjected to a certain type of thematic classification, to determine e.g. whether the image represents a portrait or a landscape. In addition, the image can be subjected to a certain type of quality classification to determine the quality of the image. Quality classes have preferably been defined beforehand. The quality classification is used to prevent "over-optimization" of an image, i.e. to ensure that an image whose quality has already been visually optimized by the method of the invention will not be processed again.

The standard observer's preference mentioned in this application is determined by presenting a number of images to a large number of people and using their observations to determine optimal values for the greyness balance, global colour reproduction and local colour reproduction of the images. Let it be stated that the standard observer's preference can be continuously "improved" by increasing the number of people to whom the images are presented. On the other hand, it is also possible to use a standard observer's preference produced by a highly skilled image processing specialist. This can be achieved e.g. by teaching that preference to the apparatus implementing the procedure.

The apparatus of the present invention for optimizing the visual quality of an image in electric format comprises a visual processor which stores predefined standard observer's preference values for greyness balance and colour reproduction and which receives an image, analyzes and classifies it and makes decisions as to how the image is to be adjusted, and a signal processor electrically connected to the visual processor to adjust the image as controlled by the visual processor.

The visual processor preferably comprises conversion means for converting the image into an Lsα coordinate format. Further, the conversion means preferably consist of electric components in the processor circuit. The signal processor may be any kind of microprocessor, programmable circuit or application-specific integrated circuit (ASIC) suited for use in signal processing.

As for the advantages of the apparatus of the invention, reference is made to those of the procedure of the invention.

BRIEF DESCRIPTION OF THE SEVERAL VIEWS OF THE DRAWING

In the following, the invention is described by the aid of examples of its embodiments by referring to the attached drawings, in which.

DETAILED DESCRIPTION OF THE INVENTION

Figure 1:
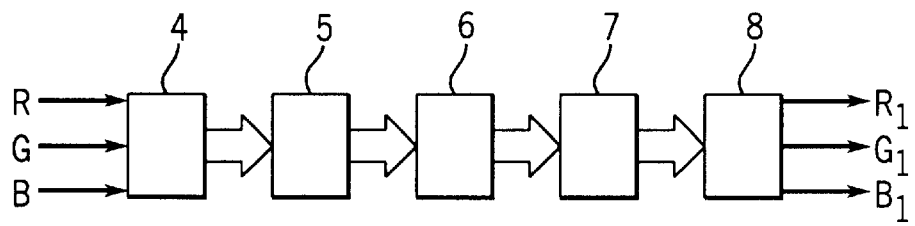
FIG. 1 presents a block diagram representing an implementation of the procedure of the invention.

Referring to the block diagram in FIG. 1, the procedure of the invention works as follows. An image e.g. in an RGB format is received in block 4 and converted into an Lsα format. This conversion is described later on by referring to FIG. 3. After this, an adjustment of the greyness balance is effected in block 5. In block 5, highest and lowest values for parameter L are determined and compared with predefined values. If necessary, based on the comparison, the whole Lsα colour space of the image is shifted so that the highest and lowest values fall on the desired point in the colour space.

After the adjustment of the greyness balance, the colour reproduction of the image is accentuated. The stages of the accentuation process are represented by blocks 6 and 7. In block 6, colour reproduction is accentuated globally concerning the whole image, and in block 7 local colour areas are accentuated. The local colour areas are determined by finding certain predefined hues and colours close to them and adjusting the areas encountered to suitable values. After both greyness balance and colour reproduction have been corrected, an Lsα=>RGB conversion is performed in block 8 to obtain new $R_1$, $G_1$ and $B_1$ values.

Figure 2:
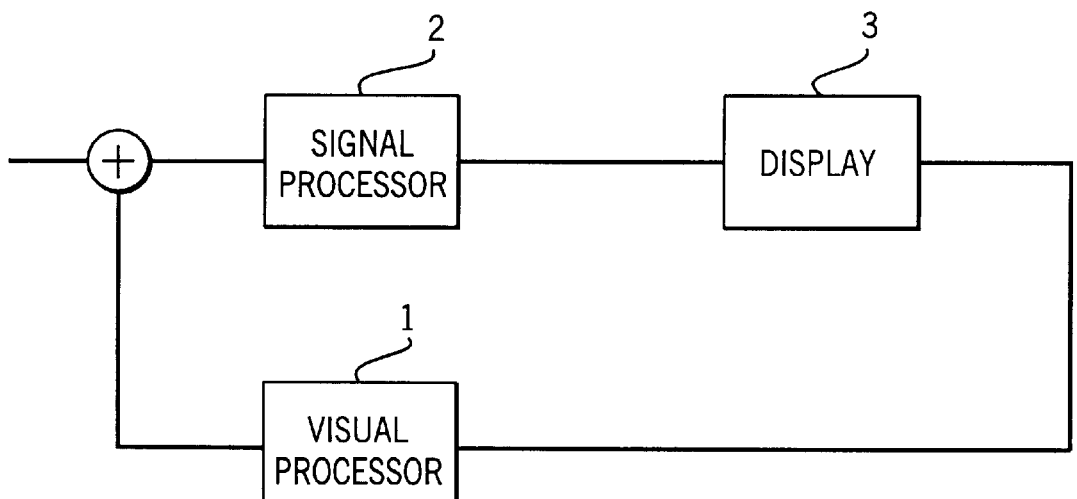
FIG. 2 presents a diagram representing an apparatus as provided by the present invention.

The apparatus represented by FIG. 2 comprises in its simplest form a visual processor 1, which classifies the image and performs the necessary operations to determine how the image is to be corrected. Moreover, the apparatus comprises a signal processor 2, which is used to perform the RGB=>Lsα conversion and is electrically connected to the visual processor 1. Controlled by the visual processor, the signal processor makes the required changes in the image. The apparatus shown in FIG. 2 also comprises a printer or a display 3 used to print or display the corrected image.

Figure 3:
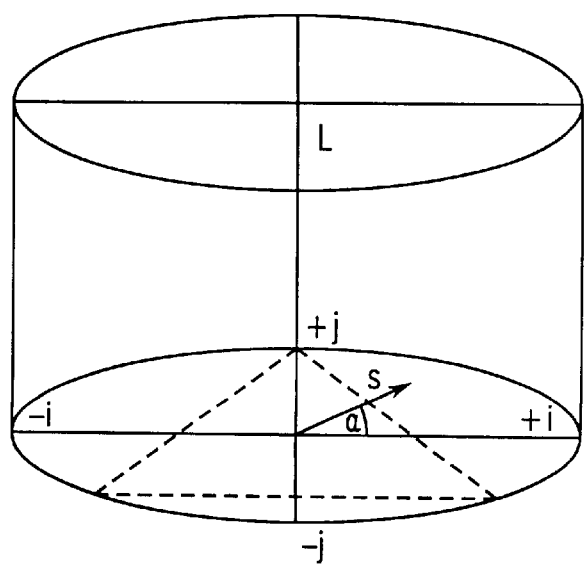
FIG. 3 represents a chromaticity coordinate format.

Referring now to FIG. 3, the RGB=>Lsα conversion performed in the first stage of the procedure of the invention is described. The colour space represented by FIG. 3 is of a cylindrical shape. The level L is determined from the RGB values according to equation (1) as follows:

$$L = \frac{V}{V_{max} + V_{plus}}, \qquad (1)$$

where:

$$V = k_1 R + k_2 + k_3 B$$

$$V_{max} = V/\max(R,G,B)$$
$$V_{plus} = a(1-Vmax), \text{ and}$$

a = user-defined constant
$k_1 + k_2 + k_3 = 1$, and
$k_1, k_2, k_3, R, G, B$ and $a \in [0, 1]$ The significance of the R, G and B values for the new parameters can be adjusted by means of the constants $k_1$, $k_2$ and $k_3$, and the proportion of neutral and saturated colours by means of the constant a.

The colour reproduction angle $\alpha 0 \leq \alpha \leq 2\pi$ is calculated from equation (2) as follows:

$$\alpha = \arctan\left(\frac{2G - R - B}{\sqrt{3(R-B)}}\right), R > B \quad (2)$$

$$\alpha = \arctan\left(\frac{2G - R - B}{\sqrt{3(R-B)}}\right) + \pi, B > R$$

(if R=B: $\alpha = 3/2\pi$; if $\alpha > 0$; $\alpha = \pi + 2\pi$)

Further, colour saturation s is calculated from the RGB values using equation (3) as follows:

$$s = \frac{\max(R, G, B) - \min(R, G, B)}{\max(R, G, B)} \quad (3)$$

After the required operations have been performed on the image in the Lsα space, analogies of equations (1), (2) and (3) can also be used for the Lsα=>RGB conversion to obtain new $R_1$, $G_1$ and $B_1$ values. Let it be noted that in this example only one chromaticity coordinate conversion has been described and that other conversions can also be used within the scope of the inventive idea.

The image may be subjected to a certain type of thematic classification to determine, for example, whether the image represents a portrait or a landscape for use in appropriate accentuation/enhancement of the image. In addition, the image can be subjected to a quality classification to determine the quality of the image. Quality classes have preferably been defined beforehand. The quality classification is used to prevent "over-optimization" of an image, i.e. to ensure that an image whose quality has already been visually optimized by the method/apparatus of the present image will not be processed again.

The invention is not limited to the embodiment examples discussed above, but many variations are possible within the scope of the inventive idea defined by the claims.

What is claimed is:

1. A method for automatically enhancing the digitized image data of a photographic color image of a given subject, said image having been subject to degradation, said method automatically compensating for said degradation to produce an enhanced image accurately representing said subject, the method comprising the steps of:
    a) converting a set of test images to an optimized Lsα color space coordinate format, in which L is lightness, s is color saturation and α is hue angle, said set of test images comprising multiple adjusted variations of multiple test images;
    b) analyzing said set of test images in order to collect test image features;
    c) collecting adjustment data based on opinions of a plurality of viewers, the adjustment data comprising the adjustment made to said test image features;
    d) converting the image data from its original color format into said optimized Lsα color space coordinate format;
    e) analyzing the converted image data in order to collect image features;
    f) comparing said image features with said adjustment data in order to find optimal values for corresponding adjustment variables;
    g) enhancing the converted image data in accordance with said adjustment variables; and
    h) converting the enhanced image data from the Lsα color space coordinate format into its original color space format for use in producing the enhanced image.

2. The method as defined in claim 1 wherein step (e) is further defined as determining the greyness balance properties of the converted image data.

3. The method as defined in claim 1 wherein steps (e), (f) and (g) are further defined as comprising the steps of:
    determining a high and a low lightness value for grey shades found in the converted image data;
    determining whether the high and low lightness values for the grey shades should be neutral grey; and
    shifting the converted image data in the optimized Lsα color space so that the high and low lightness values are located at a desired point in the Lsα color space.

4. The method as defined in claim 3 further defined as shifting the image in the optimized Lsα color space so that the high and low lightness values correspond to neutral grey, whereby white is perceived as white and black is perceived as black with the maximum degree of correctness.

5. The method as defined in claim 3 wherein the step of determining whether the high and low lightness shades should be neutral grey is further defined as carrying out the determination using a probability model.

6. The method as defined in claim 1 further comprising the step of accentuating the color in the image, said step of accentuating the color including the steps of:
    determining from the converted image data the color properties of the image;
    comparing the color properties of the image with collected adjustment data, the collected adjustment data including preferred color characteristics that enhance an image when seen by an observer; and
    enhancing the converted image data so that the color properties of the image correspond to the preferred color characteristics.

7. The method is defined in claim 6 wherein the comparing step is further defined as comparing the color properties with data of a database of preferred color characteristics compiled from the collected adjustment data.

8. The method as defined in claim 6 wherein the step of enhancing the converted image data is further defined as enhancing the converted image data to obtain global enhancement of the color properties of the image.

9. The method as defined in claim 8 further comprising the step of accentuating the color in the image, said method comprising the steps of:
    determining from the converted image data local areas in the image that should have given color properties;
    determining from the converted image data the color properties of the local areas of the image;
    comparing the color properties of the local areas with collected adjustment data, the collected adjustment data including preferred color characteristics for the local areas; and
    enhancing the converted image data so that the color properties of the local areas correspond to the preferred color characteristics.

10. The method as defined in claim 1 further comprising the step of accentuating the color in the image, said step of accentuating the color including the steps of:

determining from the converted image data local areas in the image that should have given color properties;

determining from the converted image data the color properties of the local areas of the image;

comparing the color properties of the local areas with collected adjustment data, the collected adjustment data including preferred color characteristics for local areas; and enhancing the converted image data so that the color properties of the local areas correspond to the preferred color characteristics.

11. The method as defined in claim 10 wherein the comparing step is further defined as comparing the color properties of the local areas with the data of a database of preferred color characteristics compiled from collected adjustment data.

12. The method as defined in claim 10 wherein the step of determining the local areas is carried out on the basis of occurrence probabilities in the image.

13. The method as defined in claim 10 wherein the step of determining the local areas is further defined as locating the local areas by defining a color for the local areas and searching the image using local area characteristics and the defined color to locate the local areas.

14. The method as defined in claim 1 further including the steps of:

classifying the image as to thematic type; and using the classification in processing the image.

15. The method as defined in claim 1 further including the steps of:

classifying the quality of the image into a predefined quality level; and using the classification to prevent reprocessing of an image that has already been processed.

16. An apparatus for automatically enhancing digitized image data of a photographic color image of a given subject, said image having been subject to degradation, said apparatus comprising:

a visual processor having stored therein a database of data of preferred greyness balance properties and preferred color properties for the image, the database being compiled from collected adjustment data from a plurality of viewers, said visual processor receiving the digitized image data and comparing the image data to the preferred greyness balance properties and the preferred color properties for determining the enhancement to be made to visual characteristics of the image; and a signal processor coupled to said visual processor for enhancing the digitized image data in accordance with said comparison for enhancing the visual characteristics of an image subsequently produced from the collected adjustment data.

17. The apparatus as defined in claim 16 wherein said visual processor is further defined as converting the digitized image data in an Lsα optimized color space format.

18. The apparatus as defined in claim 16 wherein said visual processor is further defined as having stored therein a database of greyness balance properties, color properties for the image, and color properties of the local areas in the image.

* * * * *